US009817975B2

(12) United States Patent
Liu et al.

(10) Patent No.: US 9,817,975 B2
(45) Date of Patent: Nov. 14, 2017

(54) METHOD FOR LOGGING FIRMWARE ATTACK EVENT AND SYSTEM THEREFOR

(71) Applicant: Dell Products, LP, Round Rock, TX (US)

(72) Inventors: Wei Liu, Austin, TX (US); Juan F. Diaz, Round Rock, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 179 days.

(21) Appl. No.: 14/605,537

(22) Filed: Jan. 26, 2015

(65) Prior Publication Data

US 2016/0217283 A1    Jul. 28, 2016

(51) Int. Cl.
*G06F 21/00*     (2013.01)
*G06F 21/56*     (2013.01)
*G06F 21/55*     (2013.01)
*G06F 21/57*     (2013.01)

(52) U.S. Cl.
CPC .......... *G06F 21/566* (2013.01); *G06F 21/554* (2013.01); *G06F 21/572* (2013.01); *G06F 2221/034* (2013.01)

(58) Field of Classification Search
CPC . G06F 21/566; G06F 21/554; G06F 2221/034
See application file for complete search history.

(56) References Cited

U.S. PATENT DOCUMENTS

| 7,281,125 | B2 | 10/2007 | Challener et al. |
| 8,055,989 | B2 | 11/2011 | McDade, Sr. |
| 9,081,954 | B2 * | 7/2015 | Forristal ............. G06F 11/3024 |
| 9,183,395 | B2 * | 11/2015 | Liles .................... G06F 21/572 |
| 2004/0193865 | A1 | 9/2004 | Nguyen et al. |
| 2009/0049221 | A1 * | 2/2009 | Rangarajan ............. G06F 13/24 |
| | | | 710/268 |
| 2009/0172381 | A1 | 7/2009 | Zimmer et al. |
| 2010/0058306 | A1 * | 3/2010 | Liles .................... G06F 21/572 |
| | | | 717/168 |
| 2011/0107072 | A1 * | 5/2011 | Lu ........................ G06F 11/0745 |
| | | | 713/1 |
| 2012/0151223 | A1 | 6/2012 | Conde Marques et al. |
| 2013/0340081 | A1 * | 12/2013 | Sakthikumar .......... G06F 21/56 |
| | | | 726/24 |
| 2014/0237220 | A1 | 8/2014 | O'Rourke et al. |
| 2014/0304520 | A1 | 10/2014 | Bobzin et al. |
| 2015/0178142 | A1 * | 6/2015 | Raj ..................... G06F 11/0787 |
| | | | 714/49 |

FOREIGN PATENT DOCUMENTS

WO    WO 2013/036223 A1 *    3/2013    ............. G06F 21/20

* cited by examiner

Primary Examiner — Beemnet Dada
(74) Attorney, Agent, or Firm — Larson Newman, LLP

(57) ABSTRACT

A violation of a firmware access rule is detected, and an entry is generated at a log file stored at a baseboard management controller, the entry identifying the violation. In an embodiment, detecting the violation is in response to receiving a system management interrupt at an information handling system.

20 Claims, 3 Drawing Sheets

METHOD FOR LOGGING FIRMWARE ATTACK EVENT AND SYSTEM THEREFOR

FIELD OF THE DISCLOSURE

This disclosure generally relates to information handling systems, and more particularly relates to logging a firmware attack event at an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

BRIEF DESCRIPTION OF THE DRAWINGS

Embodiments incorporating teachings of the present disclosure are shown and described with respect to the drawings presented herein, in which.

The use of the same reference symbols in different drawings indicates similar or identical items.

DETAILED DESCRIPTION

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
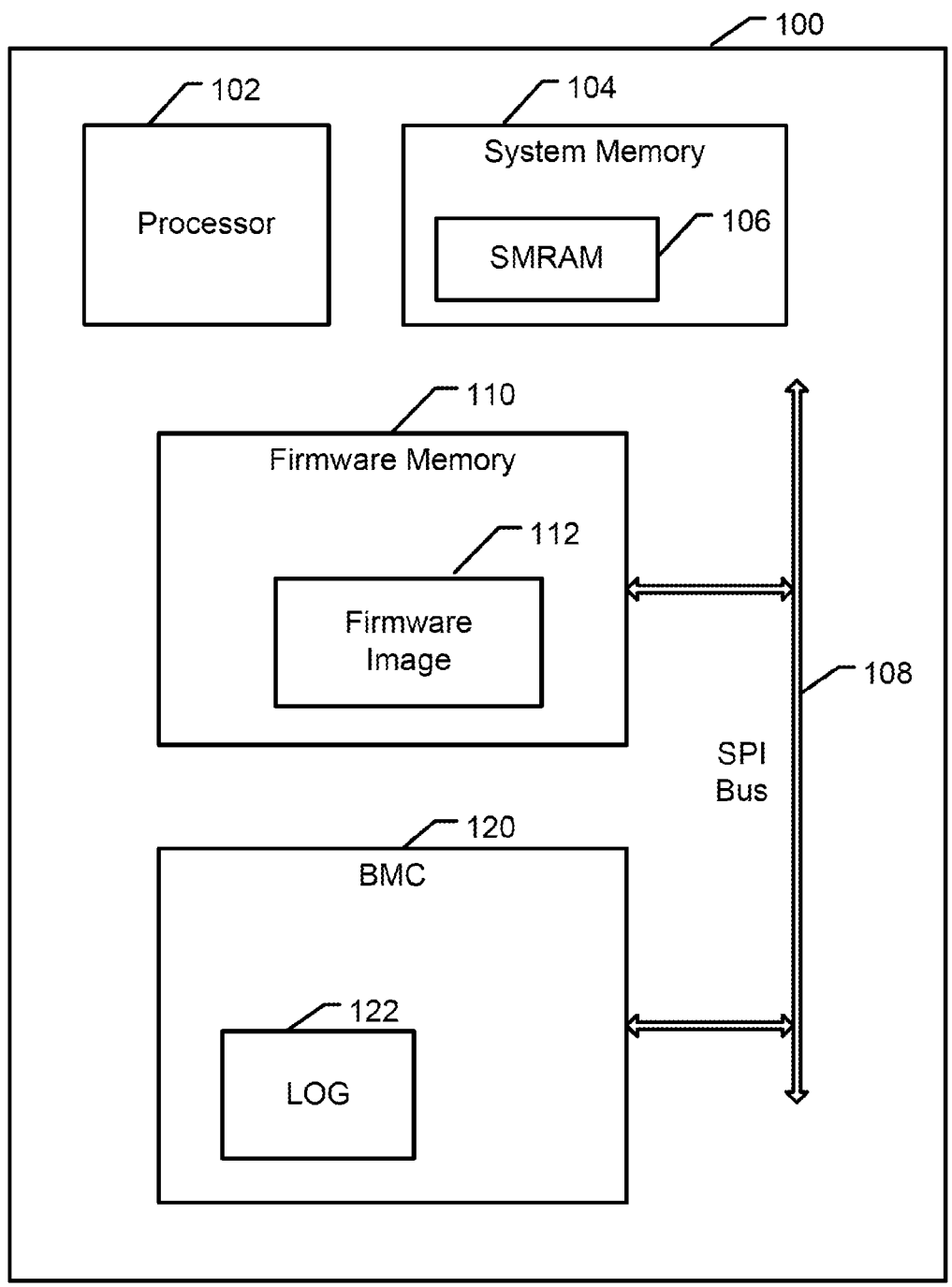
FIG. 1 is a block diagram illustrating an information handling according to a specific embodiment of the present disclosure.

FIG. 1 shows an information handling system 100 including a processor 102, system memory 104, a Serial Peripheral Interface (SPI) bus 108, a firmware memory 110, and a baseboard management controller (BMC) 120. System memory 104 can include static random access memory (SRAM), which includes an address region known as system management RAM (SMRAM) 106. Firmware memory 110 can include a non-volatile random access memory (NVRAM), and is configured to store a firmware image 112. Firmware image 112 is historically referred to as a basic input/output system (BIOS), and the term BIOS is herein used interchangeably with the term firmware image, or simply firmware. Firmware image 112 generally includes a collection of firmware routines, device drivers, and other software programs. BMC 120 includes a memory device for storing a log 122. BMC 120 is a service processor that manages the interface between system management software and platform hardware. In an embodiment, log 122 is updated in response to detecting a malicious attempt to modify system firmware. In particular, log 122 is updated during processing of a system management interrupt (SMI). A SMI causes system 100 to enter a system management mode (SMM) of operation. During execution under SMM, processor 102 is configured to execute code stored in SMRAM 106. As disclosed herein, SMI handlers include software routines for detecting multiple types of malicious activity, blocking firmware modification if the malicious activity is detected, and updating log 122 with information describing the detected activity.

BMC 120 is configured to enable remote monitoring and management of aspects of the information handling system 100. BMC 120 typically implements an Intelligent Platform Management Interface (IPMI) compliant computer interface. IPMI is a set of computer interface specifications for an autonomous computer subsystem that provides management and monitoring capabilities independently of processor 102, firmware and an operating system. IPMI defines a set of interfaces used by system administrators for out-of-band management of computer systems and monitoring of their operation. For example, IPMI can provide a way to manage a computer that may be powered off or otherwise unresponsive by using a network connection to the hardware rather than to an operating system or login shell. BMC 120 includes a non-volatile memory device for storing system information, including log 122. In an embodiment, BMC 120 can be configured to alert a system administrator, such as by email, if a malicious event is detected. The system administrator can access log 122 to query information about the malicious event, and take actions necessary to mitigate future attacks.

SPI bus 108 is a synchronous serial data link that operates in full duplex mode. It is used for short distance, single master communication, for example in embedded systems, sensors, and SD cards. Devices communicate over the SPI bus in master/slave mode where the master device initiates the data frame. While SPI bus 108 is illustrated at FIG. 1, another bus technology, such as an I2C bus and the like, can be used to communicate with BMC 120 and/or firmware memory 110.

The information handling system can include additional hardware components and additional buses operable to transmit information between the various hardware components. For example, information handling system 100 can include one or more network interface controllers, peripheral component controllers and interconnects, video display controllers, and the like. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router, wireless router, or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

SMM is an operating mode in which all normal execution, including the operating system (OS) is suspended, and special software is executed in a high-privilege mode. SMM typically supports power management, system hardware control, or proprietary original equipment manufacturer (OEM) program code. SMM is intended for use only by system firmware, not by applications software or general purpose software. SMM provides an isolated processor environment that operates transparently to the OS and software applications. SMM can only be entered in response to an SMI, which can be either hardware or software generated. A software generated SMI typically initiated by a write access to a specific input/output (I/O) port or memory location. Current processor state must be saved at SMRAM 106 before the SMI can be serviced. System 100 includes software to process SMIs and to dispatch service to an appropriate handling routine based on the source of the interrupt.

Firmware image 112 is configured to initialize and test the system hardware components, and to load a boot loader or an operating system (OS) from a mass memory device. Firmware image 112 additionally provides an abstraction layer for the hardware, i.e. a consistent way for application programs and operating systems to interact with the keyboard, display, and other input/output devices. Variations in the system hardware are hidden by the BIOS from programs that use BIOS services instead of directly accessing the hardware. When power is first applied to information handling system 100, the system begins a sequence of initialization procedures during which components of the system are configured and enabled for operation. During the initialization sequence, also referred to as a boot sequence, device drivers associated with devices included at the system 100 can be installed. Device drivers provide an interface through which other components of the system 100 can communicate with a corresponding device.

In an embodiment, the firmware image 112 at the information handling system 100 can be substantially compliant with one or more revisions of the UEFI specification. The UEFI standard replaces the antiquated personal computer BIOS system found in some older information handling systems. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the operating system. The UEFI specification allows for the extension of platform firmware by loading UEFI driver and UEFI application images. For example, an original equipment manufacturer can include customized or proprietary images to provide enhanced control and management of the information handling system 100. While the techniques disclosed herein are described in the context of a UEFI compliant system, one of skill will appreciate that the disclosed systems and methods can be implemented at substantially any information handling system having configurable firmware and one or more firmware images 112.

The firmware image 112 can be stored in firmware memory 110. A particular firmware image is typically assigned a revision number identifying the collection of firmware routines included in the firmware image. An OEM can provide updates to firmware image 112 that include improvements, corrections to address errata, and other revisions. These updates typically constitute a complete firmware image having a new revision number. A firmware update operation can include replacing the current instructions stored at firmware memory 110 with new instructions. The update process can be initiated by executing a software program provided by the OEM, via a BIOS setup interface, using BMC, or the like. In one embodiment, the software program is executed when information handling system 100 is under the control of an OS. For example, a BIOS update program can download a new firmware image and store the image in system memory 104. During a subsequent reboot at the information handling system 100, the previously existing firmware image can be erased and the updated firmware image can be stored at firmware memory 110.

Figure 2:
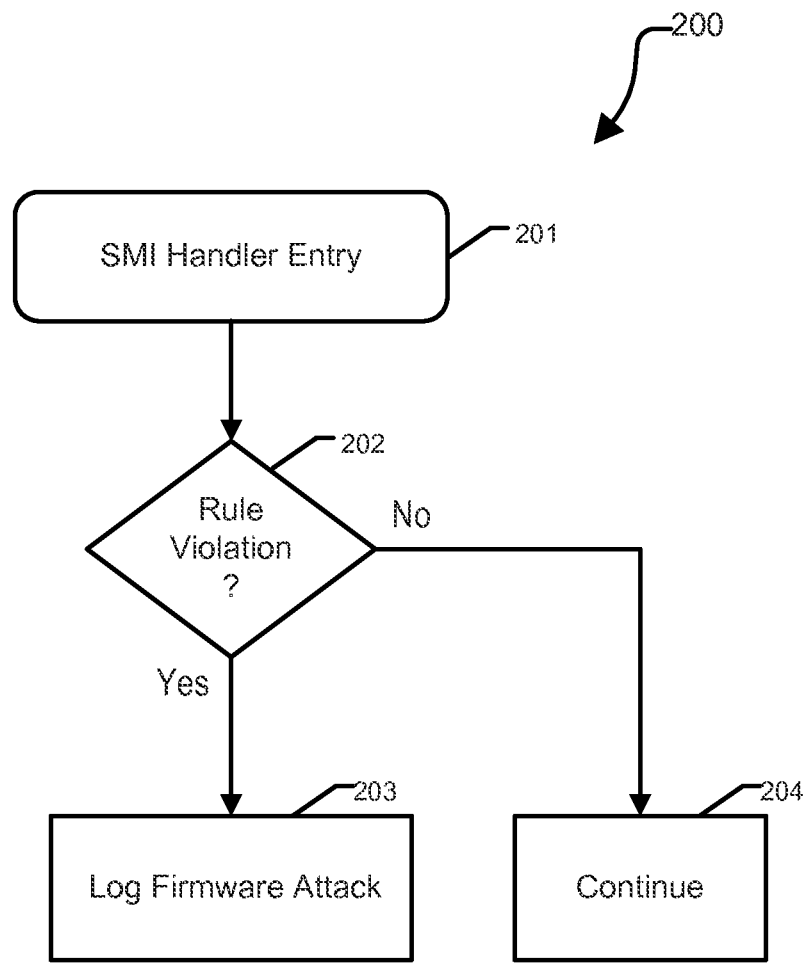
FIG. 2 is a flow diagram illustrating a method for logging a firmware attack according to a specific embodiment of the present disclosure.

FIG. 2 shows a method 200 for logging a firmware attack according to a specific embodiment of the present disclosure. The method begins at block 201 where an SMI interrupt has been received and the interrupt is dispatched to an appropriate SMI handler entry. The method proceeds to block 202 where the SMI handler determines if one or more firmware access rules have been violated. If a rule violation is identified, the method proceeds to block 203 where and indication of the violation, which may indicate a malicious attempt to modify firmware, is recorded at a log file. Log 122 may be stored at BMC 120, at firmware memory 110, at a proprietary log file, at a system event log (SEL) log file, or the like. In one embodiment, the log can be maintained at a storage device located remotely from system 100. In another embodiment, a user or system administrator can be notified of the rule violation, such as by email, by text message, or the like. The user/administrator can take appropriate actions to identify and the attack source, remove system malware, and secure system 100. Returning to block 202, if no rule violation is detected, the method continues to block 204 where service of the SMI interrupt continues. One of skill will appreciate that while method 200 illustrates detecting a firmware access rule violation in response to receiving an SMI interrupt, other techniques for accessing firmware can be monitored, and rule corresponding firmware access rule violations can be logged.

Figure 3:
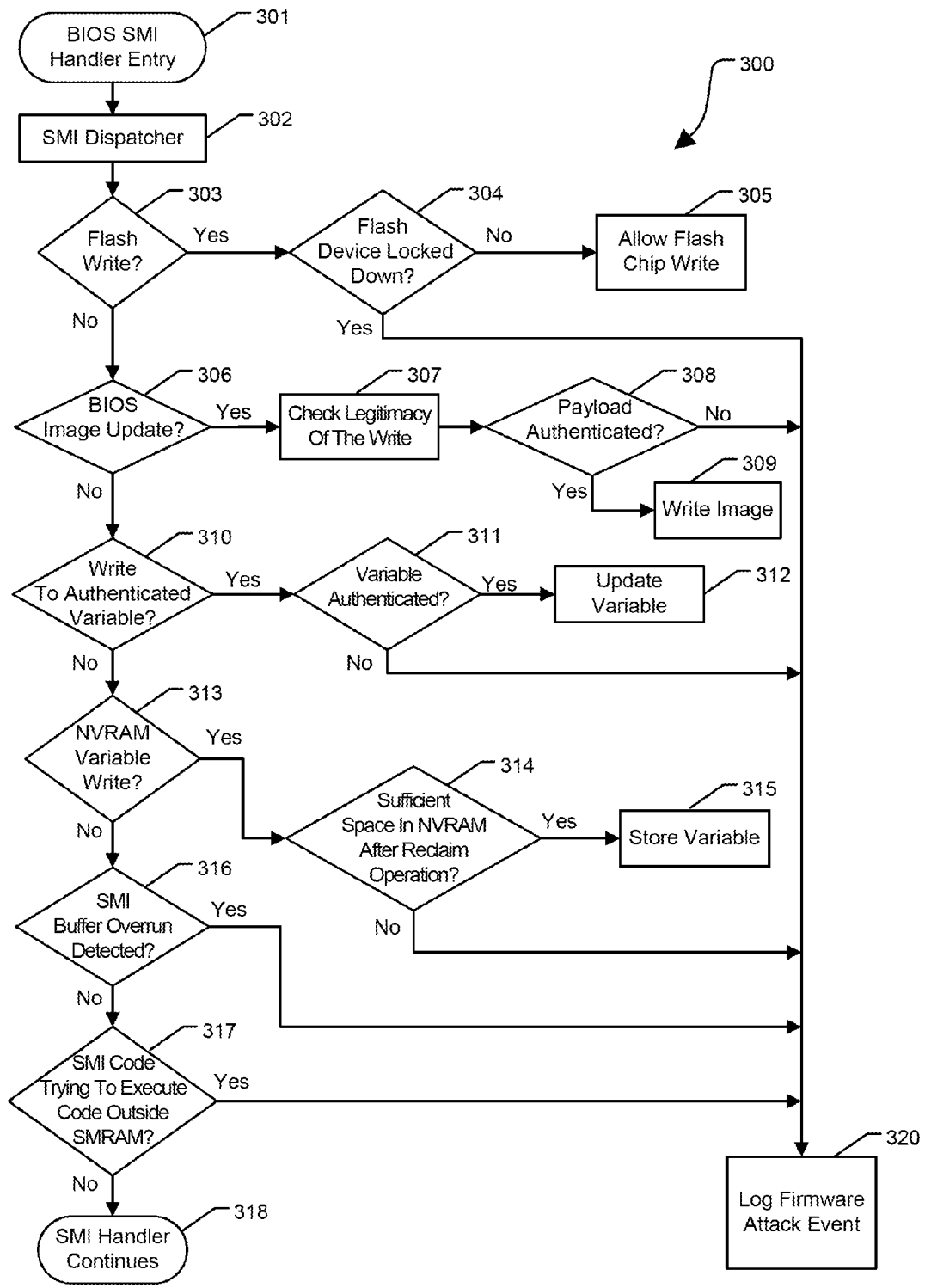
FIG. 3 is a flow diagram illustrating a method for logging a firmware attack according to another embodiment of the present disclosure.

FIG. 3 shows a method 300 for logging a firmware attack according to another specific embodiment of the present disclosure. In particular, method 300 includes examples of firmware access rule violations that can be recorded at log 122. Method 300 begins at block 301 where an SMI interrupt is associated with a corresponding SMI event handler entry. While method 300 is illustrated as a sequence of conditional operations, one of skill will appreciate that individual rules can be included in one or more corresponding SMI event handlers, as appropriate. At block 302, the SMI is dispatched. For example, the EFI_SMM_SW_DISPATCH_PROTOCOL provides the ability to install child handlers that respond to software interrupts. Upon receiving SMI CPU starts fetching SMI event handler instructions in real mode from a region of memory at system memory 104 known as SMRAM. The SMI code initializes and loads Global Descriptor Table (GDT) and transitions CPU to protected mode without paging. Servicing a software SMI can include dispatching to a target function, which is only visible within SMM and is inaccessible to processor 102 in any other operational mode. Operating System execution is suspended for the entire time SMI handler is executing until it resumes to protected mode and restarts OS execution from the point at which it was interrupted by SMI.

Method 300 continues at block 303 where it is determined that the SMI is associated with a flash write operation to update firmware image 112 at firmware memory 110. If the SMI is not associated with a flash write operation, the method proceeds to block 306. Alternatively, method 300 can continue at a subsequent block corresponding to another violation applicable to the present SMI, or the method can proceed directly to block 318 where servicing the SMI event can continue. Returning to block 303, if the SMI is associated with a flash write operation, the method proceeds to block 304 where the event handler determines whether firmware memory 110 has been locked down. Typically, security protocols prevent direct access to firmware memory 110. For example, firmware memory 110 can be locked-down during booting of system 100, placing the memory in a read-only mode and preventing any further write accesses until a subsequent boot process. If firmware memory 110 has not yet been locked down, the method continues at block 305 where the write access is allowed. However, if firmware memory 110 has been locked down, the method proceeds to block 320 where log 122 is updated to indicate the attempt to perform a write access of firmware memory 110 during lock down.

Method 300 continues at block 306 where it is determined whether the SMI is associated with a BIOS image update. If the SMI does not relate to an image update, the method continues at block 310. If the SMI is associated with an image update, the method proceeds to block 307 where legitimacy of the write operation is verified. A UEFI Firmware Management Protocol provides an abstraction for device firmware management support, including image authentication. For example, using a capsule method for performing the update operation, the new firmware image 112 is included in a signed payload. At block 308, the payload is authenticated using a security key. If the payload is successfully authenticated, the method proceeds to block 309 where the updated image 112 can be stored at firmware memory 110. However, if authentication of the payload fails, the method proceeds to block 320 where log 122 is updated to indicate the authentication failure.

Method 300 continues at block 310 where it is determined whether the SMI is associated with a write operation attempting to write to an authenticated variable. If the SMI does not relate to an authenticated variable write operation, the method proceeds to block 313. If the SMI is associated with an authenticated variable write operation, the method continues at block 311 where the variable is authenticated. The UEFI specification defines authenticated variable services to insure that a secure variable cannot be updated unless the entity attempting to update the variable possesses a private part of the digital key used to create the variable. In addition, other schemes can be utilized for protecting variables. At block 311, the event handler determines whether variable authentication was successful. If authentication was successful, the flow continues to block 312 where the variable can be updated. However, if authentication of the variable fails, the method proceeds to block 320 where log 122 is updated to indicate the authentication failure.

Method 300 continues at block 313 where it is determined whether the SMI relates to a variable write operation at firmware memory 110. If the SMI does not relate to a variable write operation, the method continues at block 316. If the SMI is associated with a variable write operation, the method proceeds to block 314 where the event handler determines whether there is sufficient space at firmware memory 110 to store the new variable. This determination can be performed after first reclaiming entries at firmware memory 112 that are no longer valid. A portion of firmware memory 110 can be allocated for storage of variables. If the variable storage region is filled up, there is a chance system 100 may fail to boot after the next system reset, or fail to properly execute SMM tasks. If the handler determines that there is sufficient space at firmware memory 110 to store the variable, the method continues at block 315 where the variable can be stored. However, if variable storage is full, or would overflow in response to storing the variable, log 122 is updated to indicate that the variable store is full.

Method 300 continues at block 316 where a SMI event handler identifies a buffer-overrun condition. A portion of address space of system memory 104 that is reserved for SMM operations, known as SMRAM, can include regions for storing SMM program code. A buffer-overrun can result in modification of SMM program code. If no overrun is detected, the method continues at block 317. If an overrun is detected, the method proceeds block 320 where log 122 is updated to indicate the situation. Method 300 continues at block 317 where a SMI handler can determine that SMI code is trying to execute code outside SMRAM address space. If no violation is detected, the method continues at block 318 where the SMI handler continues to service the SMI. However, if the handler detects that program code outside of the reserved SMRAM region is being accessed, the method proceeds block 320 where log 122 is updated to indicate the violation.

While method 300 illustrates specific examples of firmware access violations that can be detected and logged, one of skill will appreciate that additional firmware access rules can be enumerated and corresponding violations can be logged. For example, as new malicious software and firmware attack strategies are discovered, appropriate SMI handlers can be updated to detect and log these violations. Firmware access rules can further enumerate other behaviors that are not clearly malicious, but that arouse suspicion. For example, diversion from customary procedures and protocols may constitute a suspicious activity, and log 122 can be updated accordingly. In one embodiment, a log for storing firmware access rule violations can be included at firmware memory 110.

Referring back to FIG. 1, the information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media. A network interface device (not shown at FIG. 1) can provide connectivity to a network, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   receiving a system management interrupt (SMI) at an information handling system;
   executing an SMI handler in response to receiving the SMI, the SMI handler defining a list of firmware access rules identifying potentially malicious activity;
   detecting by the SMI handler a violation of a firmware access rule included at the list; and
   generating an entry at a log file stored at a memory included at a baseboard management controller, the entry identifying the violation.

2. The method of claim 1, further comprising generating an electronic mail message informing a user of the information handling system that the violation has been detected.

3. The method of claim 1, wherein the violation comprises an attempt to perform a write operation at a firmware memory after the memory has been declared as read-only.

4. The method of claim 1, wherein the violation comprises a failure to authenticate a payload containing a firmware image or a failure to authenticate a variable to be stored at a firmware memory.

5. The method of claim 1, wherein the violation comprises determining that there is insufficient space at a firmware memory to store a variable.

6. The method of claim 1, wherein the violation comprises detecting a buffer overrun that would result in modification of system management mode program instructions.

7. The method of claim 1, wherein the violation comprises determining whether a system management interrupt handler is attempting to execute instructions at a memory address that is not included at a region of system memory corresponding to a system management mode.

8. The method of claim 1, wherein the log file is a system event log.

9. An information handling system comprising:
a processor;
a system memory device; and
a firmware memory device for storing firmware, the firmware including instructions to:
receive a system management interrupt (SMI) at an information handling system;
execute an SMI handler in response to receiving the SMI, the SMI handler defining a list of firmware access rules identifying potentially malicious activity;
detect by the SMI handler a violation of a firmware access rule included at the list; and
generate an entry at a log file stored at a memory included at a baseboard management controller, the entry identifying the violation.

10. The system of claim 9, further comprising instructions to generate an electronic mail message informing a user of the information handling system that the violation has been detected.

11. The system of claim 9, wherein the violation comprises an attempt to perform a write operation at a firmware memory after the memory has been declared as read-only.

12. The system of claim 9, wherein the violation comprises a failure to authenticate a payload containing a firmware image or a failure to authenticate a variable to be stored at a firmware memory.

13. The system of claim 9, wherein the violation comprises determining that there is insufficient space at a firmware memory to store a variable.

14. The system of claim 9, wherein the violation comprises detecting a buffer overrun that would result in modification of system management mode program instructions.

15. The system of claim 9, wherein the violation comprises determining whether a system management interrupt handler is attempting to execute instructions at a memory address that is not included at a region of system memory corresponding to a system management mode.

16. The system of claim 9, wherein the log file is a system event log.

17. A non-transitory data storage medium storing instructions executable by a processor to cause the processor to:
receive a system management interrupt at an information handling system;
execute an SMI handler in response to receiving the SMI, the SMI handler defining a list of firmware access rules identifying potentially malicious activity;
detect by the SMI handler a violation of a firmware access rule included at the list; and
generate an entry at a log file stored at a memory included at a baseboard management controller, the entry identifying the violation.

18. The medium of claim 17, further comprising instructions to generate an electronic mail message informing a user of the information handling system that the violation has been detected.

19. The method of claim 1, further comprising blocking modification of firmware in response to the detecting.

20. The system of claim 9, further comprising instructions to block modification of firmware in response to the detecting.

* * * * *